United States Patent [19]

Kosuga et al.

[11] Patent Number: 4,960,642
[45] Date of Patent: Oct. 2, 1990

[54] PELLETS FOR MAKING ELECTROMAGNETIC WAVE SHIELDING MATERIAL AND METHOD FOR MANUFACTURING THE SAME

[75] Inventors: Izumi Kosuga, Yokohama; Kenichi Otani, Hiratsuka; Kazuaki Matsumuto, Hikone, all of Japan

[73] Assignee: The Furukawa Electric Co., Ltd., Tokyo, Japan

[21] Appl. No.: 163,962

[22] PCT Filed: Apr. 17, 1987

[86] PCT No.: PCT/JP87/00246

§ 371 Date: Dec. 15, 1987

§ 102(e) Date: Dec. 15, 1987

[87] PCT Pub. No.: WO87/06178

PCT Pub. Date: Oct. 22, 1987

[30] Foreign Application Priority Data

Apr. 17, 1986 [JP] Japan ................................... 61-86999
Dec. 19, 1986 [JP] Japan ................................. 61-301462

[51] Int. Cl.$^5$ ........................ B32B 5/16; B32B 15/02; B32B 27/04
[52] U.S. Cl. .................................. 428/407; 428/367; 428/379; 428/383; 428/361
[58] Field of Search ............... 428/379, 396, 367, 383, 428/406, 409; 174/35 R, 35 MS

[56] References Cited

U.S. PATENT DOCUMENTS

| 4,169,186 | 9/1979 | Tazaki | 428/406 |
| 4,332,853 | 6/1982 | Hornbeck | 428/404 |
| 4,566,990 | 1/1986 | Liu et al. | 524/439 |
| 4,596,670 | 6/1986 | Liu | 524/439 |
| 4,664,971 | 5/1976 | Soens | 428/288 |

FOREIGN PATENT DOCUMENTS

| 57-90020 | 6/1982 | Japan . |
| 59-22710 | 2/1984 | Japan . |
| 59-49913 | 3/1984 | Japan . |
| 59-49913 | 3/1984 | Japan . |
| 59-148631 | 8/1984 | Japan . |
| 59-182819 | 10/1984 | Japan . |
| 60-6764 | 2/1985 | Japan . |
| 60-162604 | 8/1985 | Japan . |
| 60-179204 | 9/1985 | Japan . |
| 61-103947 | 5/1986 | Japan . |

Primary Examiner—George F. Lesmes
Assistant Examiner—J. M. Gray
Attorney, Agent, or Firm—Frishauf, Holtz, Goodman & Woodward

[57] ABSTRACT

Pellets for making electromagnetic wave shielding material and a method for manufacturing the same are provided in which a desired number of conductive fibers of a desired length are impregnated with thermoplastic resin oligomer to provide an integral unit and then the thermoplastic resin is coated on the outside of the integral unit. The pellets are excellent in a dispersion of the conductive fibers in the thermoplastic resin, greater in aspect ratio, and excellent for use in making a shielding material against electric and magnetic fields.

5 Claims, 1 Drawing Sheet

PELLETS FOR MAKING ELECTROMAGNETIC WAVE SHIELDING MATERIAL AND METHOD FOR MANUFACTURING THE SAME

TECHNICAL FIELD

This invention relates to pellets for making electromagnetic wave shielding material using conductive fibers as a filler and a method for manufacturing the same.

BACKGROUND ART

The following are conventional methods for manufacturing pellets for making electromagnetic wave shielding material with conductive fibers dispersed in a matrix resin:

(1) A method for manufacturing pellets through the kneading of a matrix resin and conductive fibers, cut about 5 mm long by, for example, an extruder and the dispersing of the conductive fibers in the matrix resin.

(2) A method for manufacturing pellets through the coating of a strand of conductive fibers directly with a matrix resin by an extruder and the cutting of the strand to a desired length.

(3) A method for manufacturing pellets by dipping a strand made up of conductive fibers into a hot-melt resin, to coat it with the resin and by cutting the coated strand into predetermined lengths.

(4) A method for manufacturing pellets by dipping conductive fibers into a solution of a matrix resin in a solvent to coat them with the matrix resin and by cutting them to a desired length.

In the method (1), during the kneading of the conductive fibers and resin by the kneader, the conductive fibers are cut shorter than their initially cut length due to the direct cutting of the conductive fibers by a screw and due to the shearing of the resin. Furthermore, where an electromagnetic wave shielding material is formed through the molding of the kneaded material, such as an extrusion molding or injection molding, the resultant conductive fibers become much shorter. Because of the dispersion of the thus-shortened conductive fibers (0.5 mm or below) in the resin it is not yet possible to obtain a practical shield effect due to an increase in multiple contacts among the conductive fibers and to the consequent increase of electrical resistance of the electromagnetic wave shielding material. In order to improve the shield effect, more conductive fibers need to be added to the resin, resulting in high costs. According to the method (2), it is possible to prevent the undesirable cutting of the conductive fibers. However, it is difficult to disperse the conductive fibers in the resin during the molding process. This is because the conductive fibers are not uniformly mixed in the resin due to a lessening of the wettability of the conductive fibers and matrix resin. It is not possible to obtain a shield effect because of the increased electrical resistance involved. Method (3) involves poor workability and is never economical. Method (4) cannot obtain the desired surface configuration and is high in costs because of the use of the solvent.

DISCLOSURE OF INVENTION

It is accordingly the object of this invention to provide electromagnetic wave shielding pellets and a method for manufacturing the same, which causes the impregnation of conductive fibers of a collective form with a resin (the surface treatment) and the coating of the impregnated unit with another resin to be sequentially performed through the use of respective extruders to allow the conductive fibers of a predetermined length to be better dispersed, whereby it is possible to obtain an excellent electromagnetic wave shield effect.

In one aspect of this invention, pellets for making shielding electromagnetic wave shielding material are manufactured by impregnating a desired number of conductive fibers of a desired length as a collective unit with thermoplastic resin oligomer and coating the outside of the integral unit with a thermoplastic resin.

In another aspect of this invention, a method for manufacturing the aforementioned pellets comprises the steps of:

transporting a desired number of conductive fibers as a collective unit;

impregnating under pressure the integral unit of fibers with a resin which is compatible with a thermoplastic resin;

coating the outside of the integral unit with the aforementioned thermoplastic resin through an extrusion process while the impregnating resin retains its fluidity; and cutting the unit to a desired length.

According to this invention, as conductive fibers, use is made of, for example, carbon fibers or metal fibers, such as stainless steel, copper, copper alloy, iron and aluminum fibers, including metal-coated glass fibers, having a diameter of 8 to 50 $\mu m\phi$. In this connection it is to be noted that the respective fibers are bundled in groups of 1,000 to 10,000. The transported conductive fibers are impregnated, through one of extruders in tandem or through a common head, with a resin having a compatibility with a thermoplastic resin (matrix), for example, preferably in a combination of matrix resin oligomer, such as ethyleneethylacrylate copolymer (hereinafter referred to as EEA) of an average molecular weight of not more than 15,000 with acrylonitrile-butadiene-styrene copolymer (hereinafter referred to as ABS) or acrylonitrile-styrene copolymer (hereinafter referred to as AS) as a matrix resin, combination of ethylene vinyl acetate (hereinafter referred to as EVA) of a melt flow rate of 100 (g/10 minutes) or EEA of a melt flow rate of 100 (g/10 minutes) or polyester resin of

at n<300 with polyvinyl chloride resin (hereinafter referred to as PVC) as a matrix resin, combination of aliphatic hydrocarbon series wax of an average molecular weight of not more than 20,000 with polyolefin resin as a matrix resin, and combination of a linear copolymer type polyester resin of an average molecular weight of not more than 20,000 with a polyester resin as a matrix resin, are coated with said thermoplastic resin (matrix) and, subsequent to being cooled, cut by a high-speed cutter to an arbitrary length to provide pellets for shielding electromagnetic waves.

In the method of this invention, thermoplastic resin oligomer is extruded through the extruder, prior to coating conductive fibers with a thermoplastic resin (matrix), in which case the oligomer is pressurized within an oligomer-sealed nipple holder to allow it to fill the interstices of the conductive fibers.

The thermoplastic resin oligomer (matrix) should be not more than 10,000 centipoises at the time of melting and preferably not more than 5,000 centipoises, since the resin oligomer can impregnate the conductive fibers in an excellent state due to its high fluidity.

The reason why the conductive fibers are initially impregnated with the resin oligomer of such a compatibility with the thermoplastic resin (matrix) and such a high fluidity at the time of melting is that the thermoplastic resin (matrix) reveals a better wettability with the conductive fibers and the conductive fibers are dispersed uniformly in the matrix resin.

The conductive fibers, if pelletized without being impregnated with the matrix resin oligomer, reveal no firmness and, partially remain uncut, and are chained together. If successfully cut, the conductive fibers will drop off. As a result, such conductive fibers not impregnated with the matrix resin oligomer, reveal poor workability.

If, on the other hand, the conductive fibers are simply impregnated with a resin oligomer without being coated with a matrix resin in the subsequent step on the outside of the resultant structure, and then pelletized, the impregnated resin, such as oligomer, is first melted earlier than the matrix thermoplastic resin at the time of molding by an injection molding method, etc., with said pellets dry-blended with natural pellets of the matrix thermoplastic resin. As a result, the impregnated resin covers the surface of the natural pellets and these pellets slip relative to each other so that a shearing force exerted by, for example, a screw on the pellets is decreased with the consequent nonuniformity of pellets.

As the thermoplastic resin (matrix), use is made of, in addition to the aforementioned materials, polycarbonate, polypropylene, polyamide, modified polyphenylene oxide (modified PPO) or polyacetal, either single or in combination, or such a matrix resin containing a flame retardant, a glass fiber reinforcing agent or an age resistor, in which case any such resin composition may be used if it can continuously be extruded through an extruder.

If the weight mix ratio of the conductive fibers and the thermoplastic resins is such that not more than 3% by weight is conductive fibers, it is not possible to obtain any practical effect of shielding electromagnetic waves, and such that, if not less than 70% by weight is conductive fibers, the resultant pellets will be cracked due to a lesser amount of resin involved, or they will be crumbled.

On the other hand, the weight mix ratio between the thermoplastic resin oligomer and the conductive fibers is such that, if not more than 5% by weight is thermoplastic resin oligomer, the pellets obtained never produce a uniform molding owing to poor wettability between the conductive fibers and the thermoplastic resin, and such that, if not less than 30% by weight is thermoplastic resin oligomer, the mechanical properties of the thermoplastic resin (matrix) are lowered due to a greater amount of oligomer components added to the thermoplastic resin (matrix).

The conductive fibers should be 4 to 100 $\mu$m in thickness and, more preferably, 8 to 50 $\mu$m in thickness. The reasons for these are as follows. If the conductive fibers are less than 4 $\mu$m, their mechanical properties, such as tensile strength and bending strength are very low, and hence the conductive fibers produce no practical shield effect because they are cut to pieces in the forming process. The conductive fibers, less than 4 $\mu$m in thickness, are difficult to manufacture, from the industrial point of view, and very costly.

Let it be supposed that conductive fibers of not less than 100 $\mu$m and not more than 100 $\mu$m, are added into a matrix in equal amounts. In this case, these conductive fibers are less likely to produce an effective conductive path due to the small amount of the fibers. Furthermore, the conductive fibers are poor in their workability due to their greater thickness and cannot be impregnated to the thinner sections of molding products, precision component parts, and so on. According to this invention, pellets for making shielding electromagnetic waves material are preferably 3 to 10 mm in length. The reason is that, for less than 3 mm, the pellets are further cut to a smaller length at the time of molding so that no practical electromagnetic wave shielding material is obtained due to the occurrence of their multiple contact and hence to an increase in resistance and that, for more than 10 mm, the conductive fibers will form fiber balls upon being molded into a product.

BEST MODE FOR CARRYING OUT THE INVENTION

Example 1

Figure 1:
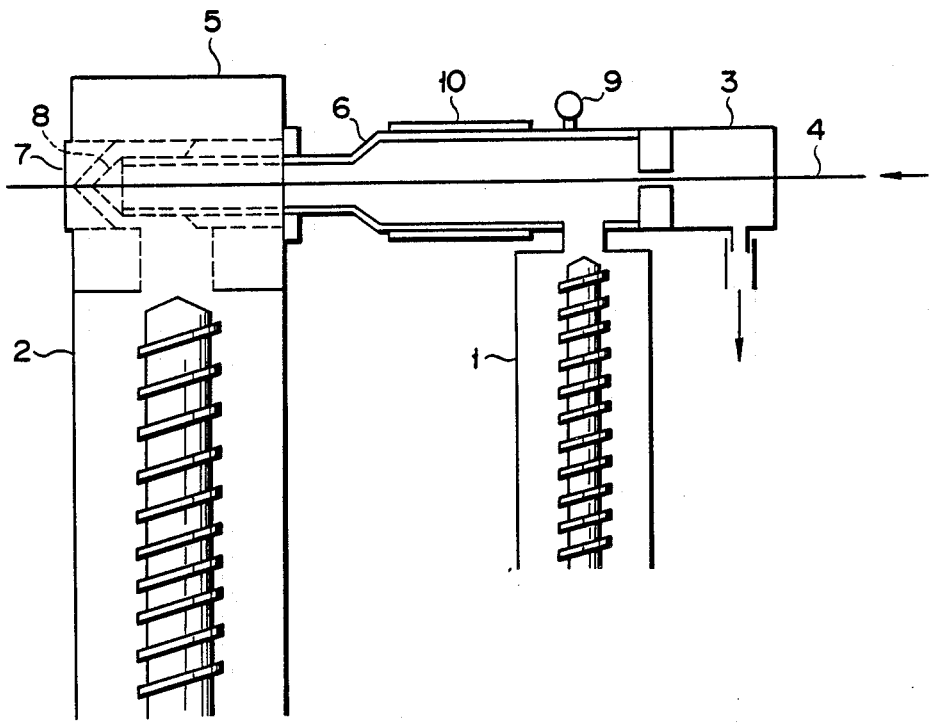
FIG. 1 is a diagrammatic explanative view showing an apparatus for manufacturing electromagnetic wave shielding pellets.

With first and second extruders 1 and 2 placed in tandem as shown in FIG. 1, 5,000 stainless steel fibers (8 $\mu$m$\phi$) were run in vacuum device 3. After running the fibers ahead and removing air surrounding the fibers, they were then passed in a polyethyleneterephthalate (PET) oligomer (melt viscosity: 1,000 centipoises at 200° C.) filling the nipple holder 6 for first extruder 1 for allowing the oligomer to be impregnated into the fibers; subsequent to bundle the fibers with the oligomer through passing a nipple 8, then coat it with polybutyleneterephthalate (trade name: 1401-X07-Toray Industries, Inc) on the outside thereof; and, subsequent to cooling the fibers coated by the resin, cut it to a length of 6 mm to obtain pellets for making shielding electromagnetic wave material. It is to be noted that vacuum device 3, though used for removing the fibers of air, may be eliminated. In FIG. 1, reference numerals 5, 7, 9 and 10 denote a crosshead, die, manometer and heater, respectively.

Example 2

As in Example 1, stainless steel fibers were impregnated through a first extruder with an EEA resin (manufactured by Nisseki Kagaku Co., Ltd) having a molecular weight of about 5,000 and then coated through a second extruder with an ABS resin (manufactured by Nippon Gosei Gomu Co., Ltd) to obtain pellets for making shielding electromagnetic wave material.

Example 3

As in Example 1, stainless steel fibers were impregnated through a first extruder with an EEA resin (manufactured by Nisseki Kagaku Co., Ltd) having molecular weight of about 5,000 and coated through a second extruder with an AS resin to obtain pellets for making shielding electromagnetic wave material.

Example 4

As in Example 1, stainless steel fibers were impregnated through a first extruder with EVA, commercially available under the trade name of EVAFEX 45X (manufactured by Mitsui Polychemical Co., Ltd), and then coated through a second extruder with PVC (manufactured by Riken Vinyl Co., Ltd) to obtain pellets for making shielding electromagnetic wave material.

Example 5

As in Example 1, stainless steel fibers were impregnated through a first extruder with a polyester resin, commercially available under the trade name of PLAXEL 1-1-1 (manufactured by Daisel Kagaku Kogyo Co., Ltd) of a structural formula

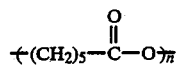

having a molecular weight of about 10,000, and then coated through a second extruder with PVC (manufactured by Riken Vinyl Co., Ltd.) to obtain pellets for making shielding electromagnetic wave material.

Example 6

As in Example 1, stainless steel fibers were impregnated through a first extruder with EEA (manufactured by Nisseki Kagaku Co., Ltd) having a molecular weight of about 5,000 and then coated through a second extruder with PVC (manufactured by Riken Vinyl Co., Ltd) to obtain pellets for making shielding electromagnetic wave material.

Example 7

As in Example 1, stainless steel fibers were impregnated through a first extruder with polyethylene-series wax commercially available under the trade name of HIGH WAX (manufactured by Mitsui Sekiyu Kagaku Co., Ltd) and then coated through a second extruder with polyethylene (manufactured by Idemitsu Sekiyu Kagaku Co., Ltd) to obtain pellets for making shielding electromagnetic wave material.

Example 8

As in Example 7, the manufacturing steps were carried out, except with the use of 300 copper fibers (50 $\mu m \phi$) in place of the aforementioned stainless steel fibers to obtain pellets for making shielding electromagnetic wave material.

Example 9

As in Example 1, stainless steel fibers were impregnated through a first extruder with a linear copolymer type polyester-series hot melt adhesive, commercially available under VIRON G×251 M (manufactured by Toyobo Co., Ltd), and then coated through a second extruder with polybutyleneterephthalate, commercially available under the trade name of 1401-X07 (manufactured by Toray Industries, Inc.), to obtain pellets for making shielding electromagnetic wave material.

Controls 1 to 6

In place of impregnating the conductive fibers with oligomers of a matrix resin extruded through a first extruder and converging them past a nipple, the conductive fibers were coated directly with the matrix resin to obtain pellets for making shielding electromagnetic wave material.

The pellets of the aforementioned Examples and Controls were injection molded under the identical conditions to yield sheets 60 mm×60 mm×3 mm. The sheets obtained were measured for their volume resistivity and for their electromagnetic wave shield effect, the results of which are shown in Tables 1 and 2.

TABLE 1

| Example | | 1 | 2 | 3 | 4 | 5 | 6 | 7 | 8 | 9 |
|---|---|---|---|---|---|---|---|---|---|---|
| Thermoplastic resin | | PBT | ABS | AS | PVC | PVC | PVC | PE | PE | PBT |
| Contents of stainless steel fiber (weight %) | | 10 | 10 | 10 | 10 | 10 | 10 | 10 | — | — |
| Contents of copper fibers (weight %) | | — | — | — | — | — | — | — | 20 | 10 |
| Volume resistivity (Ω-cm) | | $9 \times 10^{-2}$ | $1 \times 10^{-1}$ | $3 \times 10^{-1}$ | $1 \times 10^{-1}$ | $8 \times 10^{-2}$ | $8 \times 10^{-2}$ | $5 \times 10^{-1}$ | $1 \times 10^{-1}$ | $8 \times 10^{-2}$ |
| Shield effect (dB) 300 MHz | electric field | 55 | 68 | 62 | 60 | 65 | 65 | 60 | 63 | 63 |
| | magnetic field | 40 | 50 | 49 | 50 | 50 | 50 | 45 | 50 | 57 |
| Dispersibility | | excellent | excellent | excellent | excellent | excellent | excellent | excellent | excellent | excellent |
| Aspect ratio | | 350 | 300 | 280 | 300 | 320 | 310 | 250 | 300 | 310 |

TABLE 2

| Control No. | | 1 | 2 | 3 | 4 | 5 | 6 |
|---|---|---|---|---|---|---|---|
| Thermoplastic resin | | PBT | ABS | AS | PVC | PE | PE |
| Contents of stainless steel fiber (weight %) | | 10 | 10 | 10 | 10 | 10 | — |
| Contents of copper fibers (weight %) | | — | — | — | — | — | 20 |
| Volume resistivity (Ω-cm) | | $1 \times 10^{0}$ | $1 \times 10^{2}$ | $5 \times 10^{2}$ | $1 \times 10^{4}$ | $1 \times 10^{4}$ | $1 \times 10^{3}$ |
| Shield effect (dB) 300 MHz | electric field | 40 | 35 | 25 | 10 | 5 | 10 |
| | magnetic field | 20 | 15 | 20 | 5 | 0 | 6 |
| Dispersibility | | better | better | impossible | impossible | impossible | impossible |

TABLE 2-continued

| Control No. | 1 | 2 | 3 | 4 | 5 | 6 |
|---|---|---|---|---|---|---|
| Aspect ratio | 250 | 200 | 190 | 200 | 200 | 220 |

As evident from Tables 1 and 2 above, corresponding to this invention, the conductive fibers can be fully impregnated with the oligomer of the aforementioned matrix resin through the nipple holder, and are therefore very intimately dispersed at the time of molding the pellets into a sheet, in which case, an excellent shield effect has been confirmed.

Controls 7 to 12

Conductive fibers of 6 mm in cut length and thermoplastic resin pellets were extruded through a biaxial extruder to obtain composite pellets. The composite pellets thus obtained were examined for their volume resistivity, the results of which are as follows.

TABLE 3

| Control No. | 7 | 8 | 9 | 10 | 11 | 12 |
|---|---|---|---|---|---|---|
| Thermoplastic resin | PBT | ABS | AS | PVC | PE | PE |
| Contents of stainless steel fiber (weight %) | 10 | 10 | 10 | 10 | 10 | — |
| Contents of copper fibers (weight %) | — | — | — | — | — | 20 |
| Volume resistivity ($\Omega$-cm) | $1 \times 10^1$ | $1 \times 10^3$ | $1 \times 10^3$ | $1 \times 10^4$ | $1 \times 10^4$ | $5 \times 10^3$ |
| Shield effect (dB) 300 MHz electric field | 40 | 10 | 13 | 5 | 5 | 10 |
| Shield effect (dB) 300 MHz magnetic field | 15 | 7 | 7 | 0 | 0 | 8 |
| Dispersibility | excellent | excellent | excellent | excellent | excellent | excellent |

Example 10

The same manufacturing steps as in Example 2 were carried out except that, in extrusion of an EEA resin (manufactured by Nisseki Kagaku Co., Ltd) having a molecular weight of about 5,000 through a first extruder, the amount of the resin for impregnation of stainless steel fibers was changed as shown in Table 4 below by changing the pressure. In this way, pellets for making shielding electromagnetic wave material were obtained according to this invention.

TABLE 4

| Thermoplastic resin | ABS | ABS | ABS | ABS | ABS |
|---|---|---|---|---|---|
| Amount of EEA resin impregnated | 3 | 7 | 15 | 25 | 35 |
| Contents of stainless steel fiber (weight %) | 10 | 10 | 10 | 10 | 10 |
| Volume resistivity ($\Omega$-cm) | $1 \times 10^2$ | $1 \times 10^{-1}$ | $1 \times 10^{-1}$ | $1 \times 10^{-1}$ | $1 \times 10^{-1}$ |
| Shield effect (dB) 300 MHz electric field | 35 | 65 | 65 | 65 | 65 |
| Shield effect (dB) 300 MHz magnetic field | 15 | 50 | 50 | 50 | 50 |
| Dispersibility | impossible | better | excellent | excellent | excellent |
| Aspect ratio | 200 | 250 | 280 | 280 | 280 |
| Tensile strength (kg/cm$^2$) | 380 | 380 | 375 | 365 | 300 |

Molding products were manufactured with the use of the aforementioned conductive pellets and measured for their various characteristics.

As evident from Table 4, the conductive fibers if impregnated with not more than 5% weight of thermoplastic resin oligomer, are poor in dispersibility due to a lower wettability between them and the thermoplastic resin (matrix), failing to obtain any practical shielding characteristic. If the aforementioned amount is not less than 30% by weight, it has been found that the mechanical characteristics are lowered.

Example 11

Pellets for making shielding electromagnetic wave material were obtained as in Example 2, except that an amount of ABS resin (JSR35NP) extruded through a second extruder varies to such levels as in Table 5 below.

TABLE 5

| Thermoplastic resin | ABS | ABS | ABS | ABS |
|---|---|---|---|---|
| Contents of stainless steel fiber (weight %) | 2 | 10 | 40 | 75 |
| Volume resistivity ($\Omega$-cm) | $1 \times 10^4$ | $1 \times 10^{-1}$ | $1 \times 10^{-3}$ | non-pelletizable |
| Shield effect (dB) 300 MHz electric field | 5 | 67 | 75 | |
| Shield effect (dB) 300 MHz magnetic field | 0 | 50 | 70 | |
| Dispersibility | excellent | excellent | excellent | |
| Aspect ratio | 280 | 300 | 300 | |

If the amount of conductive fibers (weight %) was decreased to not more than 3:97 relative to the thermoplastic resin as shown in Table 5, it was not possible to obtain any practical shield effect. If, on the other hand, the aforementioned ratio was increased to not less than 70:30, the thermoplastic resin (matrix) was cracked or broken up, failing to obtain better pellets.

Industrial Applicability

According to this invention, only a smaller amount of conductive fibers is required due to an aspect ratio as great as not less than 100 and to a better dispersibility of the conductive fibers in the matrix resin at the time of molding. As a result, the pellets of this invention are light in weight, low in cost and excellent in a shield effect, and very useful for use in, for example, a casing of electronic apparatus.

We claim:

1. Pellets for making shielding electromagnetic wave material, comprising:
    conducting fibers selected from the group consisting of stainless steel fibers and copper fibers, said fibers having a diameter of 4 to 100 μm and a length of 6 to 10 mm;
    a thermoplastic resin oligomer having a viscosity of not more than 10,000 centipoises when melted, and impregnated into said conductive fibers, thus forming an integral unit, the weight ratio between said thermoplastic resin oligomer and said conductive fibers being 5:95 to 30:70; and
    a thermoplastic resin coated on the outside of said unit, said resin being compatible with said resin oligomer, the weight ratio of said conductive fibers to said thermoplastic resin coating being 3:97 to 70:30.

2. Pellets according to claim 1, wherein said thermoplastic resin is selected from the group consisting of a high, medium or low density polyethylene, and said oligomer is an aliphatic hydrocarbon series wax having an average molecular weight of not more than 20,000.

3. Pellets according to claim 1, wherein said thermoplastic resin is an acrylonitrile-butadiene-styrene copolymer or acrylonitrile-styrene copolymer, and said oligomer is an ethylene-ethylacrylate resin having an average molecular weight of not more than 15,000.

4. Pellet according to claim 1, wherein said thermoplastic resin is polyvinyl chloride, and said oligomer is selected from the group consisting of ethylene-vinylacetate copolymer having a melt flow rate of not less than 100 g/10 minutes, an ethyleneethylacrylate resin having melt flow rate of not less than 100 g/10 minutes, and a polyester resin having a structural formula

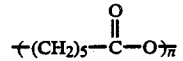

where n < 300.["]

5. Pellets according to claim 3, wherein said thermoplastic resin is an acrylonitrile-butadiene-styrene copolymer.

* * * * *